Dec. 4, 1934.     D. L. DOWLING     1,983,441
NUT SHELLING MACHINE
Filed Dec. 3, 1932     3 Sheets-Sheet 1

Inventor
D. L. Dowling
By Watson E. Coleman
Attorney

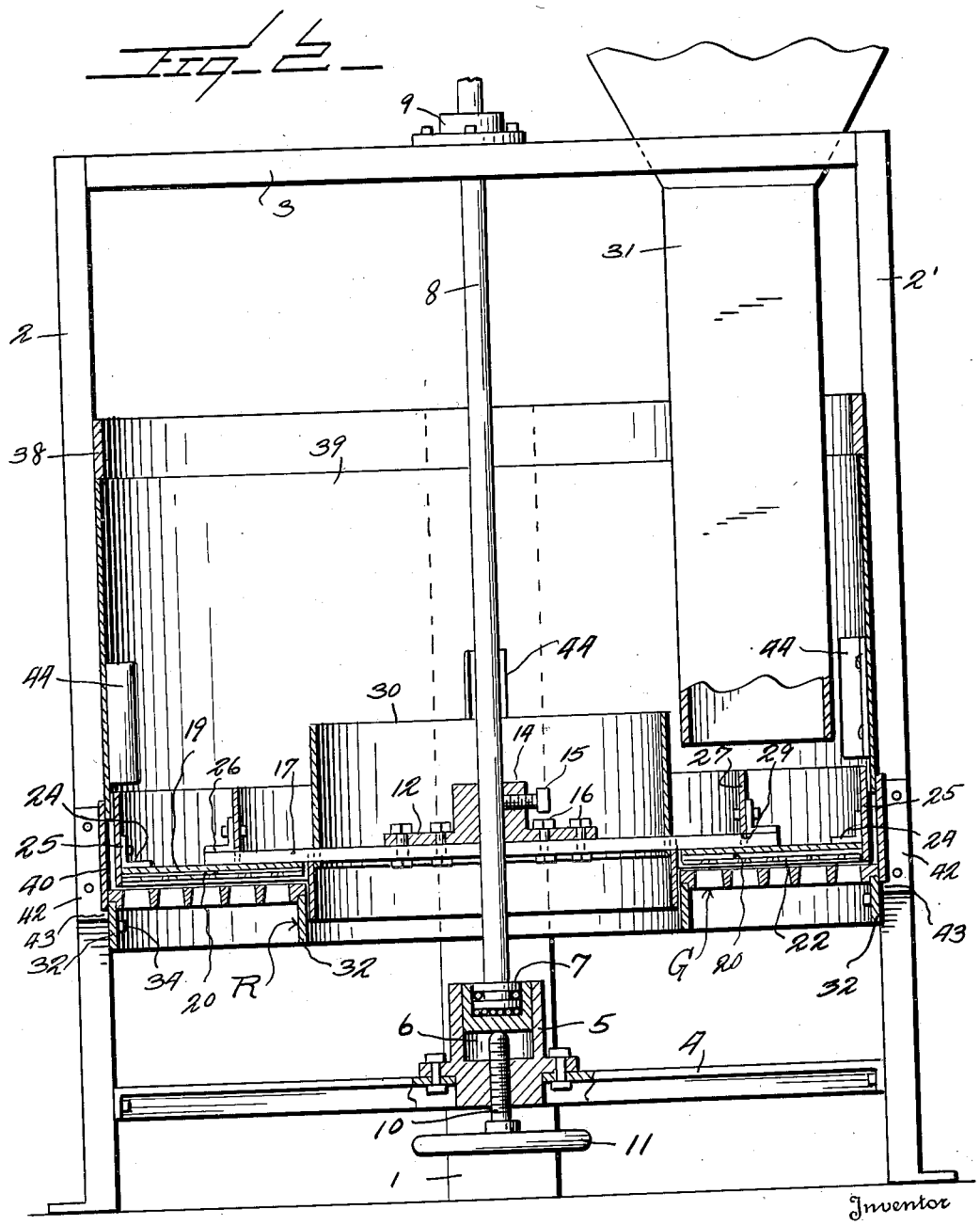

Dec. 4, 1934.　　　D. L. DOWLING　　　1,983,441
NUT SHELLING MACHINE
Filed Dec. 3, 1932　　　3 Sheets-Sheet 3
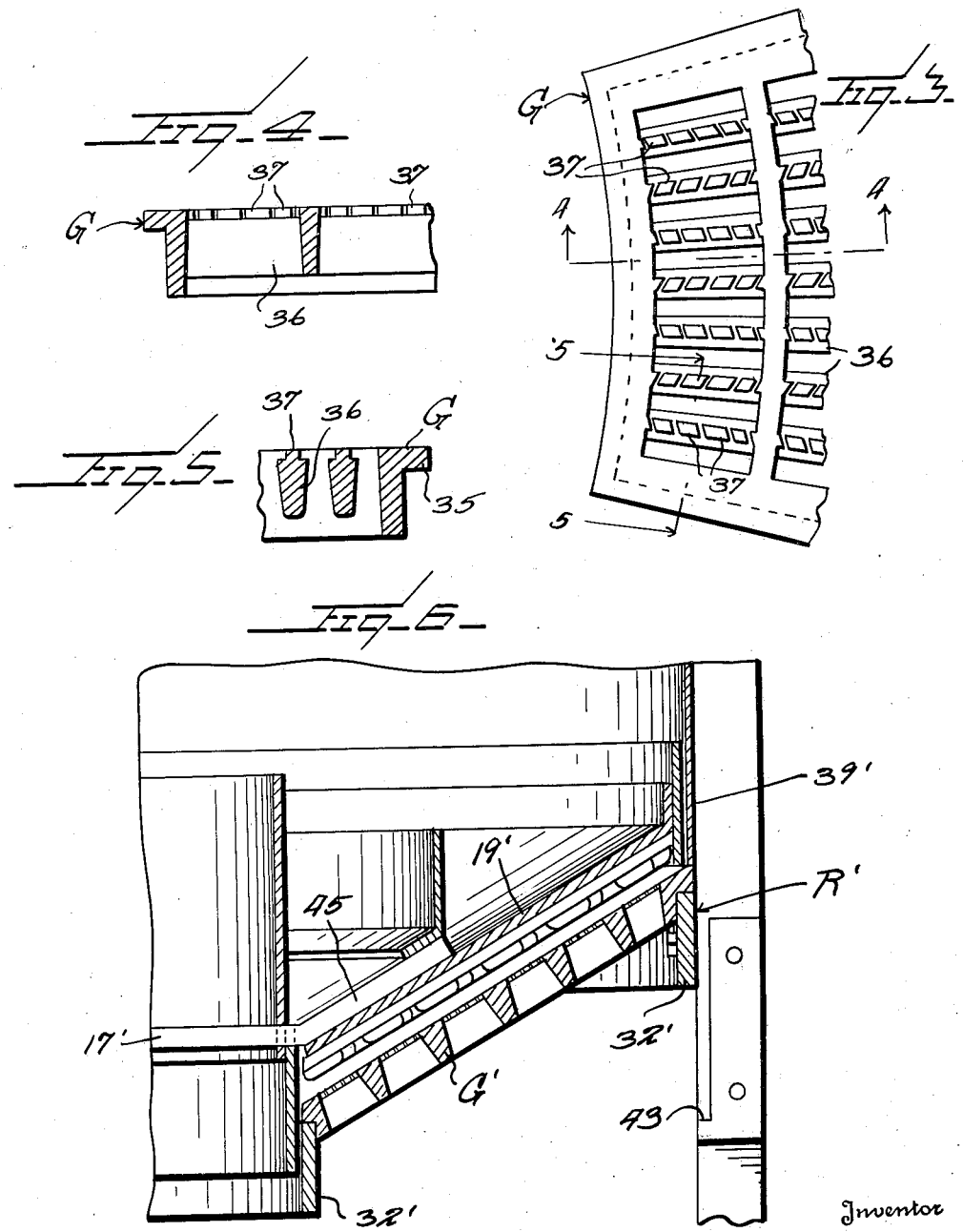

Patented Dec. 4, 1934

1,983,441

UNITED STATES PATENT OFFICE 1,983,441

NUT SHELLING MACHINE

Dempsey L. Dowling, Bainbridge, Ga.

Application December 3, 1932, Serial No. 645,613

5 Claims. (Cl. 130—30)

This invention relates to a nut shelling machine, and it is primarily an object of the invention to provide a machine of this kind wherein desired action is effected by frictional abrasion of the shells with the resultant advantage of having an extremely low percentage of broken kernels.

It is also an object of the invention to provide a machine of this kind whereby a thin layer or body of nuts is allowed to pass over an abrasive medium and also over a series of grates whereby the separated shells and kernels are permitted to be discharged through the grates.

The invention also has for an object to provide a machine of this kind comprising two working members one of which being fixed and the other being rotatable above the other, said members receiving therebetween the nuts to be shelled as a result of such relative rotation of the members and wherein means are provided to vary or adjust the space between said members as the requirements of practice may prefer.

Another object of the invention is to provide a machine of this kind embodying a grate surface over which a rotatable element is adapted to travel, said rotatable element being so constructed to move the nuts to be shelled over the grate surface to produce the desired grinding action on the shells and wherein the machine is provided with means to allow visual access to be had to the internal mechanisms or parts for inspection and repair.

It is also a particular object of the invention to provide a machine of this kind constructed and operating in a manner wherein is avoided a direct crushing action on the nuts and more particularly the shells thereof, and wherein the nut shells are subjected to a frictional abrasion of a character to assure substantially the same output as is now generally obtained from machines employing the direct crushing action on the nuts.

The invention consists in the details of construction and in the combination and arrangement of the several parts of my improved nut shelling machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:—

Figure 2 is a vertical sectional view taken substantially on the line 2—2 of Figure 1 looking in the direction of the arrow with certain of the parts in elevation;

Figure 3 is a fragmentary view in top plan of one of the stationary grate and abrasion members herein employed;

Figure 4 is a detailed sectional view taken substantially on the line 4—4 of Figure 3;

Figure 5 is a detailed sectional view taken substantially on the line 5—5 of Figure 3;

Figure 6 is a fragmentary view partly in section and partly in elevation illustrating a machine constructed in accordance with a further embodiment of my invention.

Figure 1:
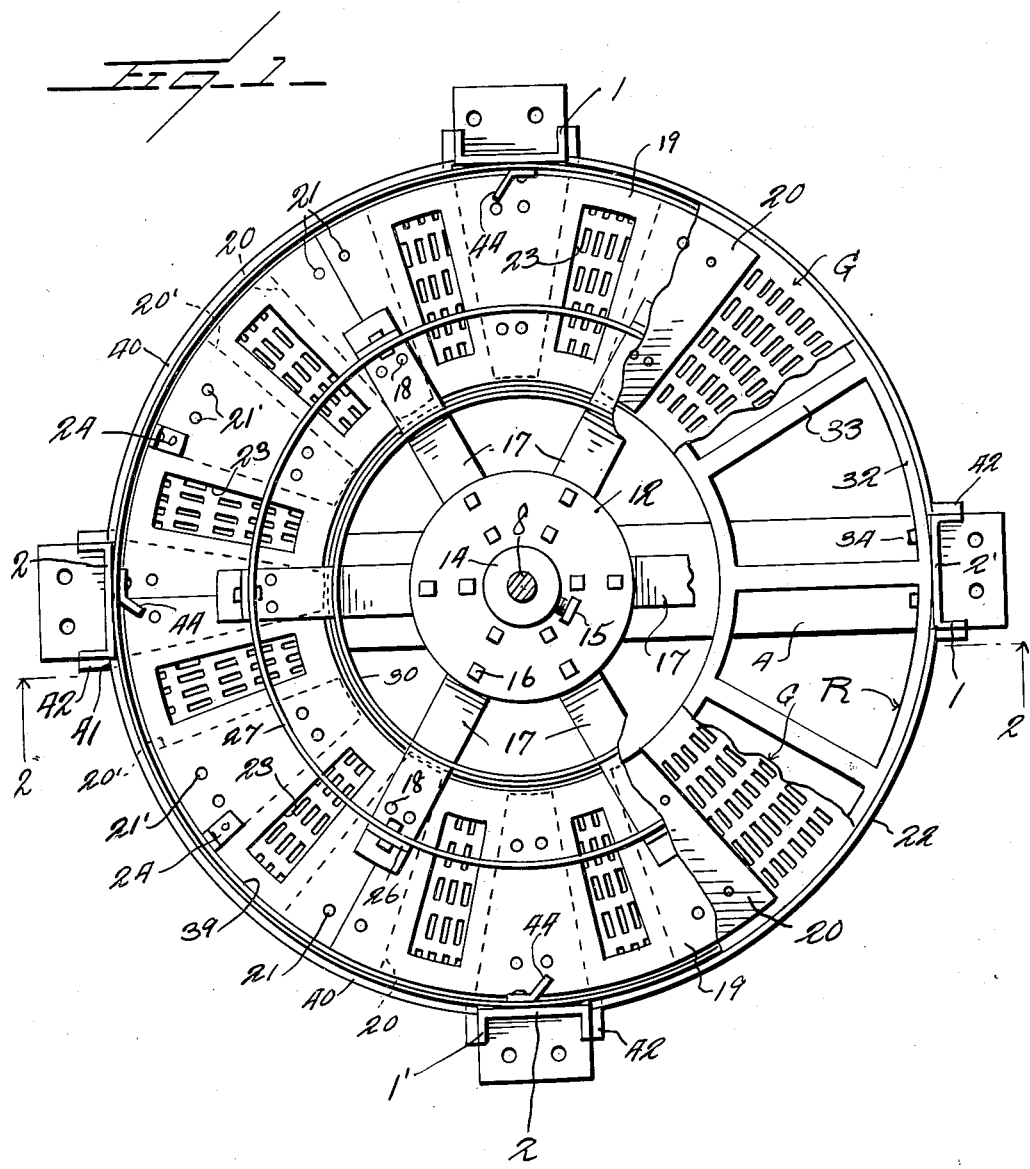
Figure 1 is a view in top plan with portions broken away of a nut shelling machine constructed in accordance with an embodiment of my invention.

As disclosed in the accompanying drawings, my improved machine comprises four uprights or standards 1, 1' and 2, 2'. These uprights or standards are arranged in quarter relation and the standards or uprights 2, 2' extend to a greater height than the standards or uprights 1, 1'. The upper extremities of the standards or uprights 2, 2' are connected by a cross beam 3 disposed radially of the machine in its general assembly. The lower portions of the standards or uprights 2, 2' are connected by a second beam 4 in parallelism with the upper beam 3. The central portion of the beam 4 supports a bearing block or base 5 having its upper portion formed with a bore or pocket 6. Snugly engaged within the pocket or bore 6 is a cup bearing 7 for coaction with the lower end portion of a vertically disposed shaft 8. This shaft 8 is of a length to extend through and above the upper beam 3 and through a bearing member 9 mounted upon the upper beam 3.

The shaft 8 is adapted to have free endwise movement through the beam 3 and the bearing member 9 and the bearing cup 7 rests from above upon the upper end portion of a shank 10 threaded from below through the lower portion of the bearing block or base 5. By requisite rotation of the shank 10 the shaft 8 may be raised or allowed to lower for a purpose to be hereinafter more particularly referred to. While any convenient means may be employed for rotating the shank 10, as illustrated in Figure 2 of the accompanying drawings, the lower extremity of this shank 10 carries a hand wheel 11.

The shaft 8 has freely mounted thereon a disc or plate 12 provided with an upstanding central hub 14 through which is threaded a holding screw 15 for engagement with the shaft 8 to hold the disc or plate 12 in desired position thereon for rotation therewith. This disc or plate 12 is preferably held in a position above but in fairly close approximation to the lower end of the shaft 8.

Secured, as at 16, to the disc or plate 12 and radiating therefrom is a series of circumferentially and equidistantly spaced radial arms 17, the outer extremities of which overlying and being riveted, as at 18, or otherwise rigidly secured to an annular plate 19. This plate 19, as herein disclosed, comprises a plurality of segments having their adjacent extremities connected by the underlying plates 20 riveted into place, as at 21, and these segments 19 also have riveted thereto, as at 21' an intermediate plate 20'. These plates 20 and 20' have their exposed faces provided with protuberances 22 providing what may be termed serrated or roughened portions whereby the desired abrasive action of the plate 19 is effected.

The plate 19 at points between adjacent plates 20 and 20' is provided with elongated openings 23 extending substantially entirely across the plate 19.

The outer marginal portion of the plate 19 has secured thereto by the brackets 24 an upstanding surrounding sleeve or outer wall 25 while held to the outer end portions of the arms 17 by the brackets 26 is an inner sleeve or wall 27. This sleeve or wall 27 is spaced inwardly a material distance from the outer sleeve or wall 25 and concentric thereto. This wall is also positioned to intersect the openings 23 at points inwardly of their inner ends. The lower edge of the sleeve or wall 27 has close contact with the upper face of the plate 19 for which reason the lower marginal portion of said sleeve or wall 27 is provided with suitable notches 29 to accommodate the arms 17. The arms 17 also carry an annular upstanding sleeve or wall 30 which, as herein disclosed, is of a height to extend above the sleeves or walls 25 and 27. This sleeve 30 coacts with the wall or sleeve 27 to provide an inner annular compartment to receive the nuts to be shelled while the walls or sleeves 25 and 27 coact to provide an outer annular chamber to receive the nuts.

Supported by the upper beam 3 or otherwise as may be preferred is a delivery spout or chute 31 leading from a suitable source of supply of nuts to be shelled and which spout or chute terminates in close proximity to the two annular compartments above the plate 19 and at a point in close proximity thereto as is illustrated in Figure 2 of the accompanying drawings.

The plate 19 and the other members carried by the arms 17 rotate with the shaft 8 and the plate 19 rotates above an annular grate rack R. This rack R, as herein disclosed, comprises two concentrically arranged annular members 32 connected at equidistantly spaced points by the intermediate radial arms 33. The outer annular member 32 is bolted, as at 34, or otherwise anchored to the standards or uprights 1, 1' and 2, 2' whereby the rack R is fixedly maintained in desired position. The rack R is adapted to have mounted thereon and support a series of grate members G which, when applied, have adjacent ends substantially in butting or contact relation so as to provide a substantially annular grate. The upper marginal portion of each of the grate sections G is provided with the outstanding defining flanges 35 which are adapted to rest from above upon the members 32 and 33 of the rack R. The walls of the grate bars 36 are inwardly and downwardly tapered to assure a free discharge therethrough of the separated shells and kernels and to further assure the desired abrasive action upon the shells, the upper surfaces of the bars 36 are provided with the upstanding humps or protuberances 37. The plate 19 may be selectively spaced with respect to the assembled grate sections G upon requisite manipulation of the shank 10 hereinbefore referred to. This selective adjustment is of advantage in order to assure effective operation of the machine in accordance with the average size of the nuts to be shelled thereby.

The upper end portions of the standards or uprights 1, 1' and 2, 2' at corresponding heights are connected by an annular member 38 bolted or otherwise held in place and directly below this member 38 is an annular plate 39 spot welded or otherwise fixedly secured to the standards or uprights 1, 1' and 2, 2'. This plate terminates a desired distance above the grate rack R in order to provide sufficient space to allow access to the interior of the machine for the purposes of inspection and repair. This space, however, is normally closed by the segmental extension plates 40. Each of these plates 40 has its extremities engaged within the guideways 41 provided in the forward marginal portions of the plates 42 secured to the sides of the standards or uprights 1, 1' and 2, 2'. The lower portion of each of the guideways is intersected by a stop shoulder 43 whereby the downward movement of a plate 40 is determined.

The plate 39 together with the extension plates 40 when in closed position serve to retain the nuts and particularly to prevent the nuts from being drawn out before being shelled. The plate 39 at desired points therearound has secured thereto the inwardly directed wings 44 which are positioned closely adjacent to the upper margin of the outer wall or sleeve 25. These plates or wings 44 serve to maintain the nuts to a certain degree in agitation as the plate 19 rotates to assure the proper feeding of the nuts down through the openings 23 for proper abrasive engagement between the grate sections G and the plate 19 for effecting the desired breaking of the shells to release the kernels.

My improved machine is particularly intended for use in connection with the shelling of peanuts and it is to be particularly noted that the construction and operation of the machine is such to avoid a direct crushing action on the shells as it is only necessary that the plate 19 have a sufficiently high speed to produce by a frictional abrasion on the shells an output of shelled nuts substantially equal to that obtained by a direct crushing action and with the further advantage of having an extremely low percentage of broken kernels as compared with the direct crushing principle.

It is also to be stated that the plates 44 hereinbefore referred to serve to push or force the nuts back toward the center of the machine and thereby keep the nuts properly spaced with respect to the shelling surfaces. It is also to be stated that by providing the inner wall or sleeve 27 the desired effective spreading of the nuts upon the plate 19 is assured whereby the efficiency of the machine is increased.

In the embodiment of the invention as illustrated in Figure 6 of the drawings, the construction of the machine is substantially the same as that hereinbefore set forth with respect to the first assembly except that the members 32' of the grate rack R' are arranged with the outer member 32' occupying a plane above the inner member 32' so that when the grate sections G' are positioned such grate sections will be disposed on an inward and outward incline. The annular member 19' is of course similarly inclined and for which reason the outer extremity of each of the arms 17' is disposed on the required upward incline as indicated at 45.

With this form of machine the tendency of the coacting grate sections G' and plate 19' is to hold the nuts more centrally on the grate sections thus preventing the nuts from being thrown outwardly against the plate 39'.

From the foregoing description it is thought to be obvious that a nut shelling machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A machine of the class described comprising an annular series of grates, an annular member, means for supporting said annular member for rotation above the grate members, said annular member having openings at spaced points therealong to allow nuts to be shelled to pass through said openings between the grate members and the upper annular member, an annular wall substantially defining the inner marginal portion of the upper annular member and bridging the space between said annular member and the lower grate members.

2. A machine of the class described comprising an annular series of grates, an annular member, means for supporting said annular member for rotation above the grate members, said annular member having openings at spaced points therealong to allow nuts to be shelled to pass through said openings between the grate members and the upper annular member, and annular members substantially defining the inner and outer marginal portions of the upper annular member and rotating thereon, said annular members being upwardly disposed.

3. A machine of the class described comprising an annular series of grates, an annular member, means for supporting said annular member for rotation above the grate members, said annular member having openings at spaced points therealong to allow nuts to be shelled to pass through said openings between the grate members and the upper annular member, annular members substantially defining the inner and outer marginal portions of the upper annular member and rotating thereon, said annular members being upwardly disposed, and a third annular member positioned between the last named annular members and extending upwardly, said intermediate annular member being also disposed across the openings between the ends of said openings.

4. A machine of the class described comprising an annular rack, means for supporting the same in a fixed position, grate sections mounted upon and supported by said rack, a vertically disposed shaft positioned substantially axially of the rack, an annular member positioned above the rack and the grate sections thereon, means for connecting the annular member to the shaft for unitary rotation, said annular member having openings at spaced points thereon, the face of the annular member opposed to the grate sections being provided with means for imposing frictional abrasion upon nuts passing through the openings in the annular member and between the annular member and grate sections.

5. A machine of the class described comprising a fixed member, a second member positioned thereabove, means for supporting said second member for movement with respect to the fixed member, opposed faces of the members having means to create frictional abrasion upon nuts delivered between said members, the upper member having openings to allow nuts to pass between the members, and means for causing nuts positioned above the upper member to move inwardly as the upper member rotates.

DEMPSEY L. DOWLING.